United States Patent [19]

Carney et al.

[11] Patent Number: 4,876,900
[45] Date of Patent: Oct. 31, 1989

[54] RACKET STRING TENSION TESTER

[76] Inventors: William P. Carney; Donald P. Carney, both of 4 High Ridge La., Oyster Bay, N.Y. 11771

[21] Appl. No.: 205,846

[22] Filed: Jun. 13, 1988

[51] Int. Cl.⁴ ............................................... G01L 5/06
[52] U.S. Cl. ................................ 73/862.48; 73/862.47
[58] Field of Search ............ 73/862.48, 862.47, 862.45

[56] References Cited

U.S. PATENT DOCUMENTS 4,590,808  5/1986  Lightfoot et al. ............... 73/862.48
4,794,805  1/1989  Carney et al. .................... 73/862.48

Primary Examiner—Joseph A. Orsino
Assistant Examiner—Hollis T. Chen
Attorney, Agent, or Firm—Charles E. Temko

[57] ABSTRACT

An improved tennis racket string tension tester of enhanced accuracy and convenient adaptability to rackets of varying configuration and string spacing. To provide for strings of varying diameter and grid spacing, a series of interchangeable washers are provided which exactly fit a centrally disposed interstice and a string grid defined by two horizontal and two transversely extending strings. Deflection of a known type strain gauge is indicated by a liquid crystal readout.

10 Claims, 4 Drawing Sheets

RACKET STRING TENSION TESTER

RELATED APPLICATION

Reference is made to U.S. Pat. No. 4,794,805 filed May 4, 1987 which discloses and claims a related invention.

BACKGROUND OF THE INVENTION

This invention relates generally to devices for testing the tension of tennis rackets, and more particularly to improvements therein affording improved accuracy and providing for the accommodation of rackets of different manufacture and configuration.

In the above-mentioned copending application, there is disclosed a testing device having a generally cylindrical housing which engages one side of the string grid and a thumb wheel which engages segments of the engaged strings on an opposite side thereof, and which displaces the central area of the strings a given distance to create a measurable strain which is, in turn, determined by a known electronic strain gauge mounted upon or associated with a deflectable beam, the strain gauge providing data which is processed to provide a digital readout.

While this structure represents a substantial improvement over prior art devices, we have found that where the device is used for measuring string tension in a variety of racket styles having strings of varying diameter and string spacing, the degree of accuracy is not constant, and in some cases not capable of repetition. This problem appears to be due to the fact that the degree of deflection required is quite small, and in some cases, is approximately equal to the diameter of the string. If the means used to deflect the strings operate in a manner that the diameter of the string determines the degree of deflection, as, for example, where the strings are moved against a surface which determines the degree of deflection, the actual lateral displacement of the string grid will vary accordingly, and a supposed standard displacement will not, in fact, occur. Thus, similar rackets, strung to an identical tension, using strings of different diameters will not be deflected to the same degree, and will provide different tension readings.

In the device described in the above-mentioned application, the generally centrally disposed strings forming the racket face are deflected within an enclosed area determined by a generally circular housing. While in theory, this should provide a more accurate reading, in fact, we have found that the use of the housing in which only the enclosed string segments participate in deflection tend to provide a displacement-string relation which is other than substantially linear within the range of interest, thus tending to result in readings which are less accurate than desirable.

Further, with the use of an electronic strain gauge to provide tension readings, no provision has been made in the prior art constructions to provide a "zero point" which will cancel out commercial manufacturing tolerances, variations in string diameter, and other inaccuracies inherent in testing devices of the described type.

SUMMARY OF THE INVENTION

Briefly stated, the invention contemplates a device of the type described in which means have been incorporated to assure that a predetermined lateral movement imparted to a deflecting element will result in a predetermined deflection of a string grid of a tennis racket irrespective of the string diameter. This is accomplished by providing an interchangeable washer of generally cylindrical configuration having a stepped central portion, the diameter of which corresponds to the width of a generally centrally disposed rectangular interstice in the string grid with which it is engaged. This construction assures that the washer will engage with equal force all four of the strings forming an interstice as well as the immediately adjacent strings, the force being transmitted by a planar surface of the washer surrounding the stepped central portion in uniform manner with all strings being deflected substantially equally. In lieu of an enclosed predetermined test area, the housing against which the strings are deflected include a segmented string-engaging edge surface enabling only a string contacted by the washer to be the principal participant in the determination of the final reading, with resultant increased linearity of the deflection-tension curve.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 2:
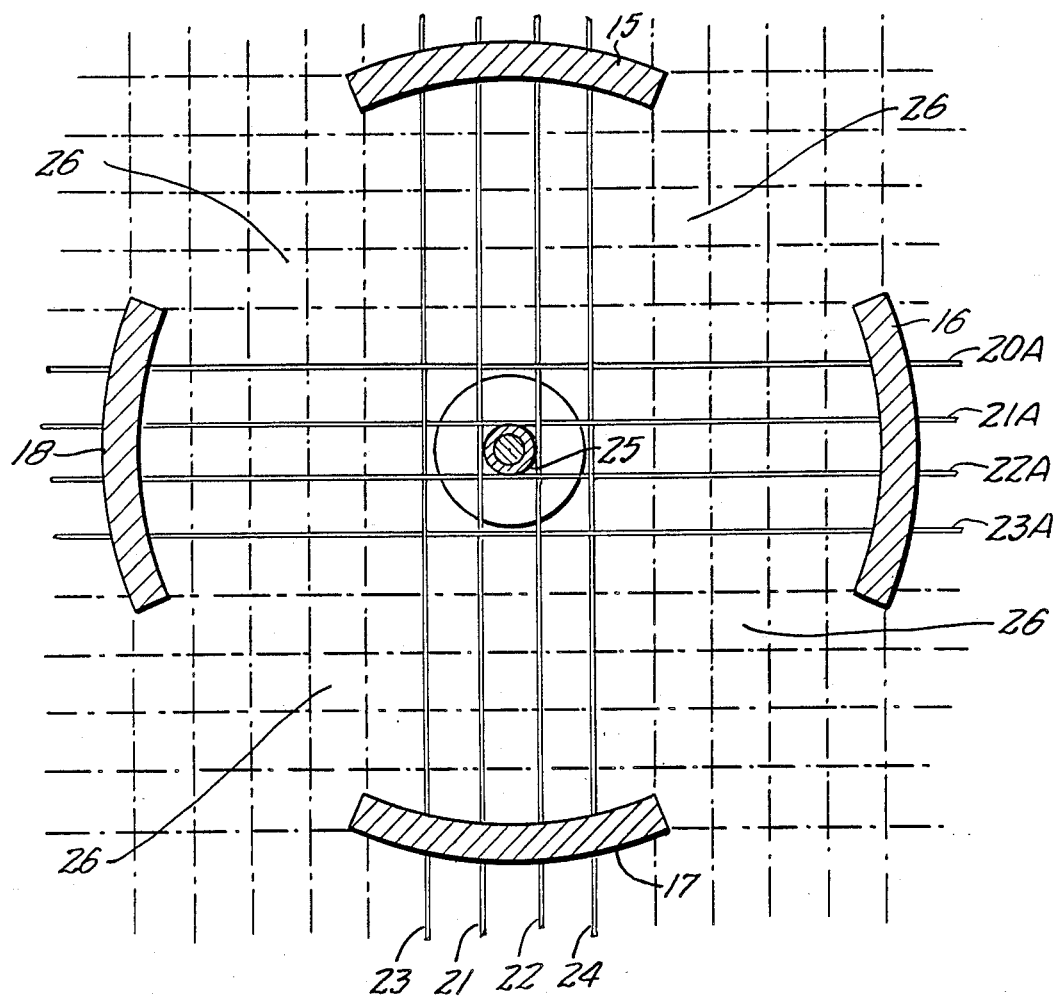
FIG. 2 is a schematic cross-sectional view thereof as seen from the plane 2—2 in FIG. 1.

In accordance with the first embodiment of the invention, generally indicated by reference character 10, the device comprises a generally circular mainframe 11 including an upper wall 12 and a segmented peripheral wall 15, a lower portion 14 of which wall forms individual segments 15, 16, 17 and 18. Each of the segments include a lower surface 19 adapted to contact one side of the string grid of the racket being tested. Referring to FIG. 2 in the drawing, it will be observed that the surfaces 19 are adapted to contact four longitudinal string segments 21, 22, 23, and 24 and four corresponding laterally extending string segments 20A, 21A, 22A, and 23A. The most centrally disposed of these segments forms an interstice 25. Non involved areas 26 are not covered by the surfaces 19, and strings disposed within these areas are not primary participants in the determination of the displacement tension measurement performed by the device.

Referring again to the mainframe 11, an inner surface 28 supports a strain gauge beam 29 cantilevered at one end 30, and mounting an electronic strain gauge 31 thereon of known type. A free end 32 of the beam 29 is contacted by a first end 33 of a lever 34 supported on a pintle 35 at a medial portion thereof. A second end 36 is connected by a pintle 37 to a shaft 38 at an upper end 39 thereof. A lower end 40 thereof is threaded.

Figure 1:
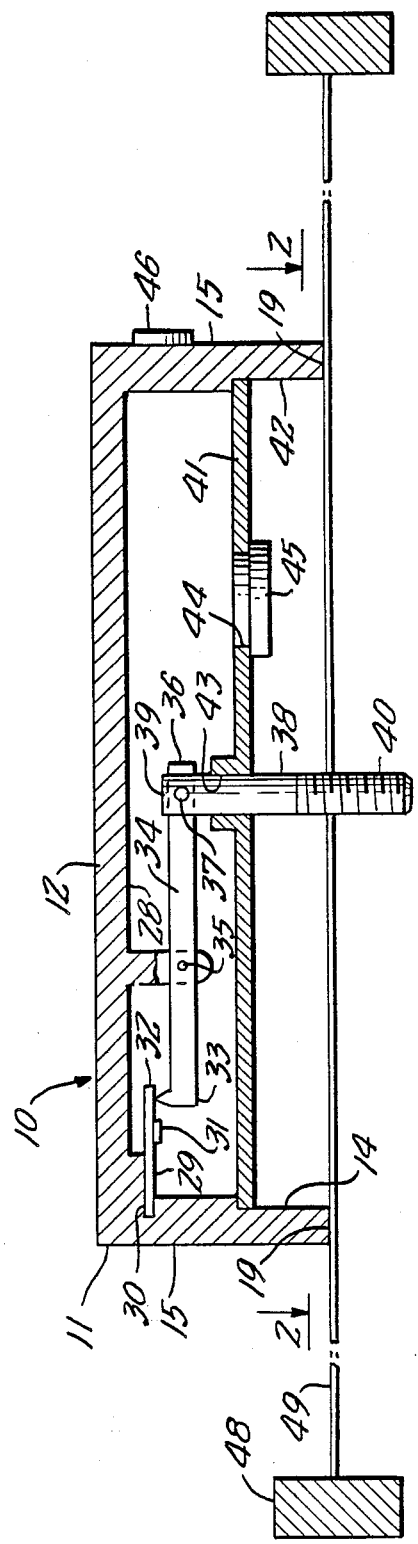
FIG. 1 is a schematic cross-sectional view of an embodiment of the invention with certain of the component parts thereof removed for purposes of clarity.

The mainframe 11 supports a lower wall 41 and a recess 42, the wall 41 forming a centrally disposed opening 43 which guides the shaft 38 and a second opening 44 which mounts a liquid crystal display 45 which may be observed from a position corresponding to a lower portion of FIG. 1. The display 45 is provided with a zero set button 46 which places the readout at zero position prior to the making of a measured deflection, as will more fully appear hereinafter. Reference character 48 indicates a conventional racket frame having a string grid 49.

Figure 3:
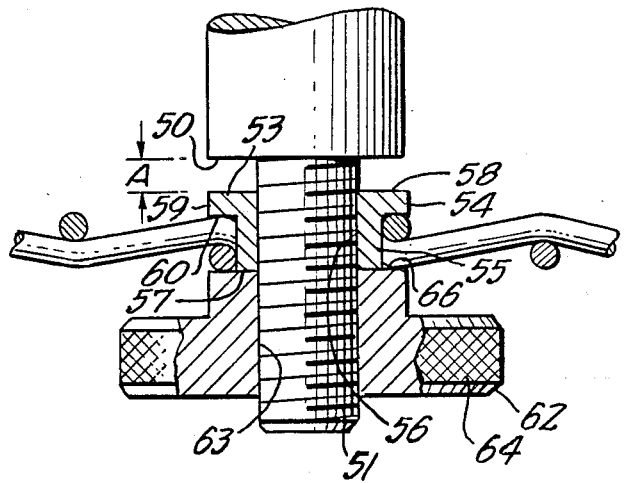
FIG. 3 is a fragmentary vertical cross-sectional view corresponding to the central lower portion of FIG. 1, and showing the engagement of string deflection means.

Referring to FIG. 3, the shaft 38 forms a transversely extending surface 50 from which the threaded shank 51 extends.

Surrounding the shank is a stepped interchangeable washer 53 of configuration conforming to the size of a particular interstice 25 which may be conveniently formed either as a synthetic resinous molding or a die casting. The washer includes a base portion 54 and a cylindrical portion 55, there being a smooth centrally disposed bore 56 extending between first and second surfaces 57 and 58. The cylindrical portion 55 is bounded by an outer cylindrical surface 59 of predetermined diameter.

Threadedly engaged upon the shank 51 is a thumb wheel 62 including a threaded central bore 63 and an outer serrated surface 64. A circular end surface 66 is adapted to contact the strings, which are thereby pinched against a radial surface 60 on the washer 53 as the thumb wheel 62 is tightened. With tightening, the surface 57 is urged upwardly as seen in FIG. 3 until the distance "A" indicated thereon is traversed, and the surface 50 is contacted. It will be observed that this movement constitutes a fixed predetermined displacement, and since the thumb wheel bears directly against the cylindrical portion 55, with such displacement, the strings are not crushed or otherwise damaged. By substituting washers 53 having cylindrical portions 55 of varying lengths and outer cylindrical surfaces 59 of varying diameters, it is possible to take into account the diameter of the strings forming the string grid and various string grid spacing while still maintaining a fixed stress displacement.

Figure 4:
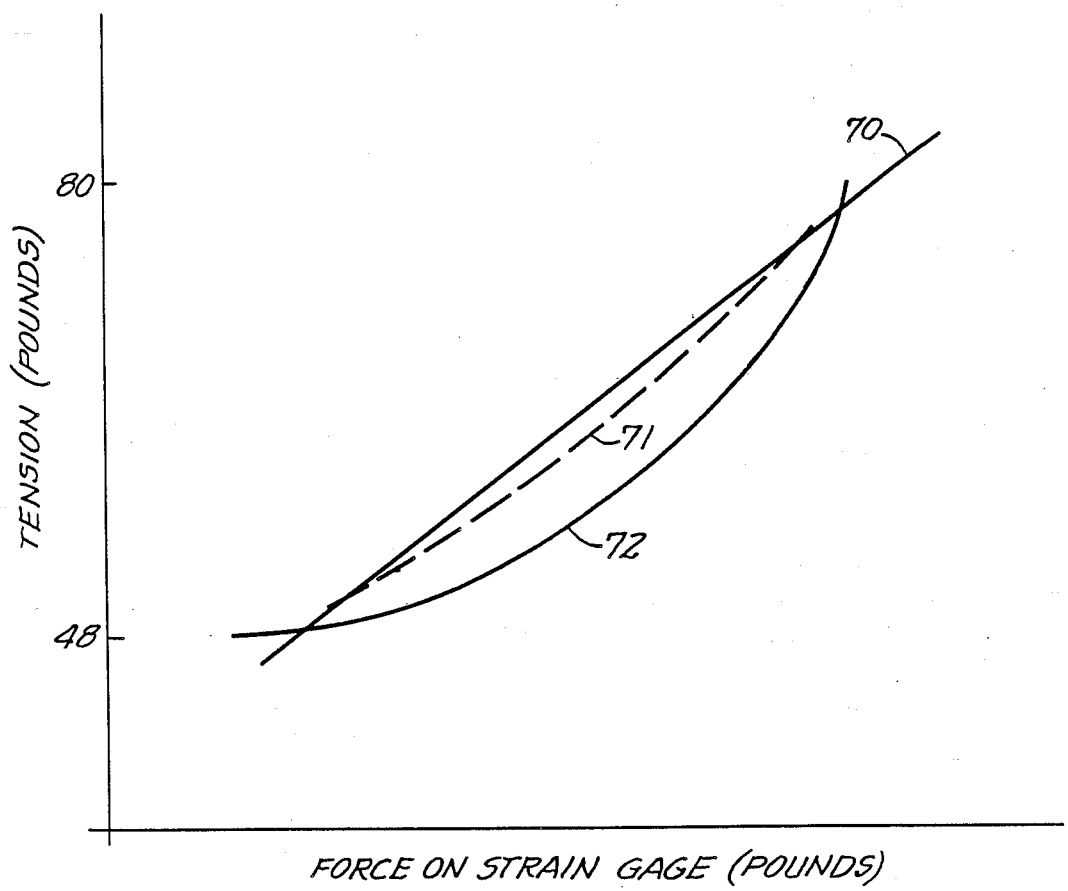
FIG. 4 is a graph illustrating the plotting of string tension against force exerted, upon the strain gauge beam forming a part of the embodiment.

FIG. 4 is a graph illustrating the force-displacement curve obtained when using the device. Curve 70 is a straight line representing an ideal condition. Curve 71 represents a curve obtained using the present embodiment which closely approximates a straight line over the area of interest. Curve 72 illustrates the curve when using the device disclosed in my above-mentioned copending application which employs a mainframe housing which forms an enclosed circular area. The reason curve 72 is of greater arcuate configuration apparently lies in the fact that more strings participate in the reading than is the case in the present embodiment, where only those strings immediately adjacent the centrally disposed interstice 25 participate.

Figure 5:
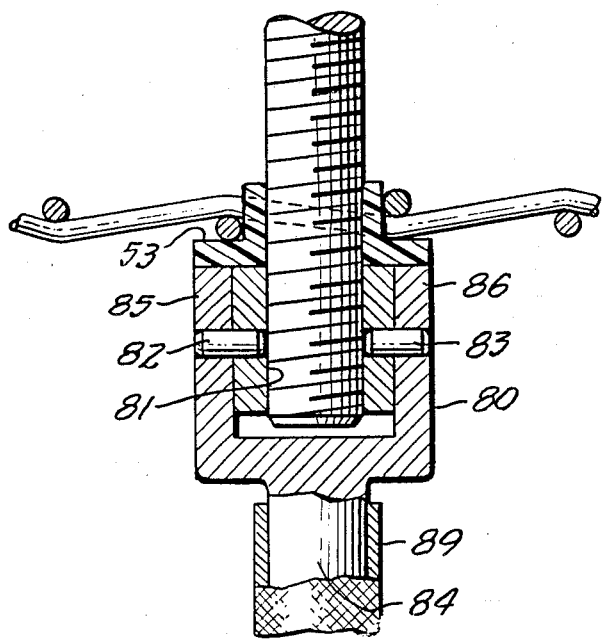
FIG. 5 is a fragmentary vertical cross-sectional view corresponding to that seen in FIG. 3, but showing an alternate form of construction.
Figure 6:
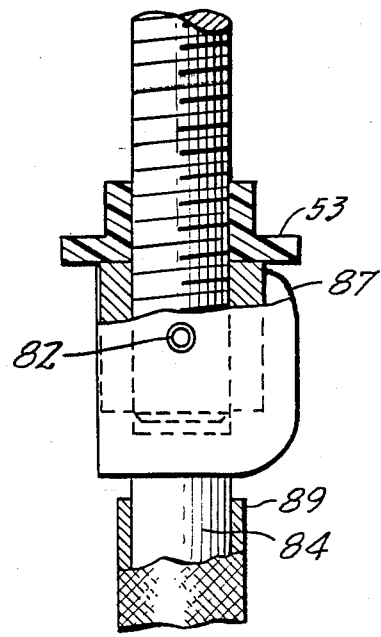
FIG. 6 is a fragmentary view in elevation, partly in section as seen from the left-hand portion of FIG. 5.

FIGS. 5 and 6 illustrate an alternate form of construction in which the thumb wheel 62 is replaced by a lever operated toggle element generally indicated by reference character 80 which prevents placing excess pressure on the strings. The element 80 includes an internally threaded sleeve 81 interconnected by pintles 82 and 83 to a lever member 84 having first and second cam members 85 and 86, each including a camming surface 87. The handle member 84 is provided with a frictionally retained sleeve 89 which frictionally rides thereon, and which, when manually engaged, permits transmission of a limited degree of torque therebetween. When excess torque is exerted, the frictionally retained sleeve 89 will slip, this slippage normally occurring when the internally threaded sleeve 81 has reached the position shown in FIG. 5, which will be a point from which measured displacement takes place.

When this position has been reached, the lever member 84 is then rotated about the pintles 82 and 83 to bring the camming surfaces 87 into play against the washer, and measured displacement is determined when the lever member 84 has been moved through 90°.

Figure 7:
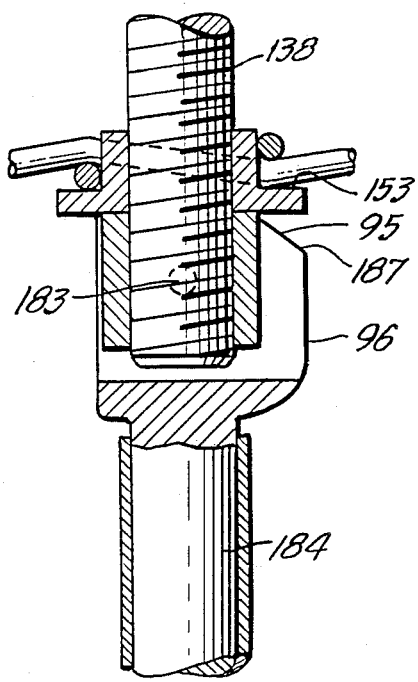
FIG. 7 is a fragmentary view in section, partly in elevation, corresponding to that seen in FIG. 6 showing a modified form of cam profile.
Figure 8:
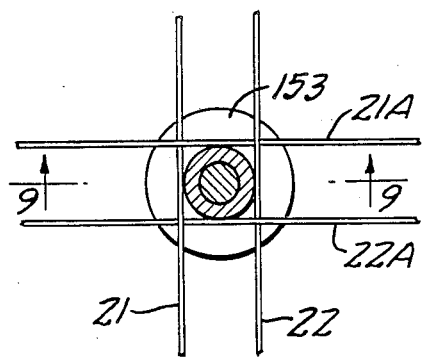
FIG. 8 is a fragmentary sectional view as seen from the upper portion of FIG. 6.
Figure 9:
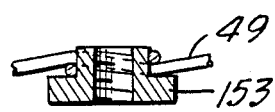
FIG. 9 is a fragmentary sectional view as seen from the plane 9—9 in FIG. 8.

FIG. 7 illustrates a further modification, in which, to avoid needless repetition certain of the component parts have been designated by reference characters corresponding to those employed in FIG. 5 with the additional prefix "1".

In this form, the camming surface 187 has been modified to provide a first planar portion 95 and a second planar portion 96 which permits the obtaining of a very small degree of displacement to establish a reference plane from which further displacement will be measured. When the handle has been moved to engage the surface 95, the liquid crystal display 45 may be "zero set" to cancel out existing errors caused by commercial tolerances and other factors. In this position, very little stress is exerted on the string grid.

Figure 10:
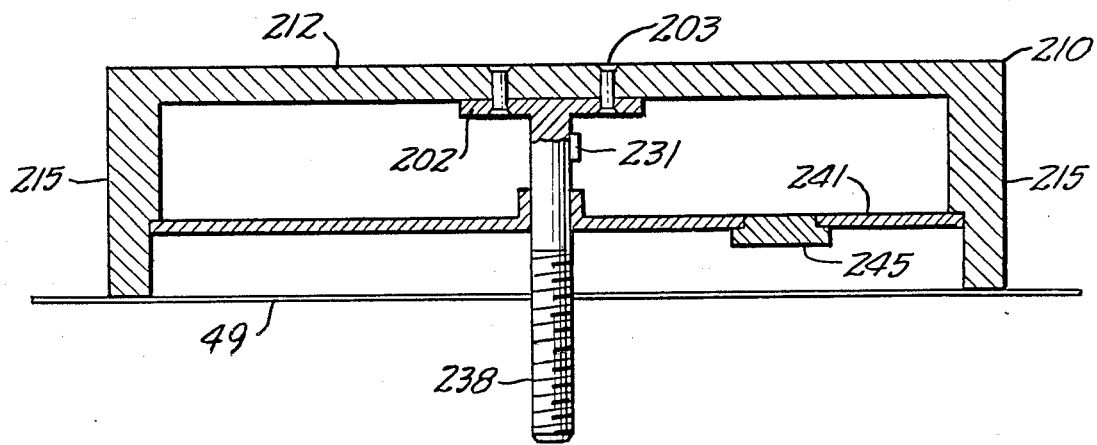
FIG. 10 is a schematic sectional view showing a second embodiment of the invention.

FIG. 10 illustrates a second embodiment of the invention, in which, to avoid needless repetition, certain of the parts corresponding to those of the first embodiment have been designated by similar reference characters with the additional prefix "2".

In this embodiment, a cantilevered beam of the first embodiment has been eliminated, and the strain gauge 231 is mounted directly upon the shaft 238 which is formed of material sufficiently ductile to permit elongation under stress. The upper end of the shaft is secured by a plate 202 secured by rivets 203 to the undersurface of the wall 212. Operation of this embodiment is substantially similar to that of the first embodiment.

We wish it to be understood that we do not consider the invention to be limited to the precise details of structure shown and set forth in this specification, for obvious modifications will occur to those skilled in the art to which the invention pertains.

We claim:

1. In a device for determining tension in the strings of a tennis racket, the strings forming a grid, including a generally cylindrical mainframe adapted to contact said strings on a first side thereof and a string deflecting means adapted to contact said strings on a second side thereof serving to deflect said strings to a predetermined degree; and sensing means for determining the value of tension in said strings developed upon deflection to said predetermined degree, the improvement comprising: said sensing means carried by said mainframe; said deflecting means including a shaft projecting through an interstice between four intersecting generally centrally disposed string segments, said shaft having a first end contacting said sensing means, and a second end having deflecting means thereon; an interchangeable cylindrical washer having a centrally disposed bore surrounding said shaft, and adapted to be contacted by said deflecting means to deflect said strings from the plane of said grid; said washer having a planar base of diameter greater than the width of said interstice, and having a surface adapted to contact said strings, and means for centering said washer with respect to said interstice; whereby upon operation of said deflecting means, the force required to cause the degree of deflection of said strings will be confined substantially to the strings forming said interstice.

2. The improvement set forth in claim 1, further characterized in said washer having a stepped portion of outer diameter corresponding to the width of an interstice, and adapted to be projected through said interstice to fix the position of said washer relative to said grid.

3. The improvement set forth in claim 1, further characterized in said deflecting means including a manually operated toggle, said deflecting means being part of said toggle.

4. The improvement set forth in claim 2, further characterized in said sensing means comprising a cantilevered beam, having a first end connected to said mainframe, and a free end projecting inwardly thereof, an electronic strain gauge mounted upon said beam, a lever mounted upon said mainframe for pivotal movement about an axis through a medial portion thereof, said lever having a first end contacting said free end of said beam, and a second end pivotally interconnected to said shaft.

5. The improvement set forth in claim 4, further characterized in said deflecting means having a cam profile providing a detent position corresponding to an initial string displacement reference point, said sensing means including digital readout means which may be preset to zero to correspond to said reference point.

6. The improvement set forth in claim 3, further characterized in said string deflecting means including a threaded shaft, said toggle including an internally threaded sleeve engageable upon said threaded shaft for relative rotation to create an initial string displacement reference point for purposes of tension measurement, said toggle including a handle member pivotally connected to said sleeve for increasing displacement of strings beyond said reference point, said sensing means including a digital display which may be zeroed in relation to said initial reference point prior to said further displacement.

7. The improvement in accordance with claim 1, further characterized in said mainframe having a segmented arcuate edge contacting only the strings forming said interstice to deflect the same, whereby substantially only the strings forming the interstice and those immediately adjacent to the interstice participate in the determination of a tension reading resulting in a substantially linear deflection-tension curve.

8. The improvement set forth in claim 6, further characterized in said toggle including a manually engageable handle having a frictionally retained sleeve thereon capable of relative rotation with respect to said handle upon the attainment of a predetermined degree of torque, whereby to prevent overtightening of said threaded shaft against string segments in obtaining said initial displacement position.

9. The improvement set forth in claim 7, further characterized in said sensing means including a cantilevered beam carried by said main housing and having a free end thereon, said shaft having a free end contacting said beam.

10. The improvement set forth in claim 1, further characterized in said sensing means, including a strain guage mounted directly upon said shaft, said shaft being formed of material sufficiently ductile to permit elongation under stress.

* * * * *